(12) United States Patent
Zhang et al.

(10) Patent No.: US 10,580,413 B2
(45) Date of Patent: Mar. 3, 2020

(54) METHOD AND APPARATUS FOR OUTPUTTING INFORMATION

(71) Applicant: Baidu Online Network Technology (Beijing) Co., Ltd., Beijing (CN)

(72) Inventors: Zhongqi Zhang, Beijing (CN); Tian Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/133,422

(22) Filed: Sep. 17, 2018

(65) Prior Publication Data
US 2019/0147885 A1    May 16, 2019

(30) Foreign Application Priority Data

Nov. 16, 2017  (CN) .......................... 2017 1 1189004

(51) Int. Cl.
| | |
|---|---|
| *G10L 15/06* | (2013.01) |
| *G10L 17/04* | (2013.01) |
| *G10L 17/22* | (2013.01) |
| *G06F 21/32* | (2013.01) |
| *G10L 15/22* | (2006.01) |

(52) U.S. Cl.
CPC .............. *G10L 17/04* (2013.01); *G06F 21/32* (2013.01); *G10L 15/22* (2013.01); *G10L 17/22* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 6,681,205 | B1* | 1/2004 | San Martin | G10L 17/24 704/243 |
| 8,775,187 | B2* | 7/2014 | Summerfield | G10L 17/04 704/273 |
| 10,276,168 | B2* | 4/2019 | Sun | G10L 15/30 |
| 10,325,603 | B2* | 6/2019 | Li | G10L 17/04 |
| 10,360,916 | B2* | 7/2019 | Perotti | G10L 15/22 |
| 2017/0221488 | A1* | 8/2017 | Xiong | G10L 15/26 |

FOREIGN PATENT DOCUMENTS

JP      2013037512 A    2/2013

* cited by examiner

*Primary Examiner* — Satwant K Singh
(74) *Attorney, Agent, or Firm* — Knobbe, Martens, Olson & Bear, LLP

(57) ABSTRACT

Embodiments of the disclosure disclose a method and apparatus for outputting information. A specific embodiment of the method includes: receiving voice information, analyzing the voice information to generate voiceprint information; matching the voiceprint information with at least one piece of pre-stored voiceprint information; outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and outputting, in response to determining the voice reply message instructing to add the new user, a voice prompt message prompting the user to bind an account. The embodiment has improved the flexibility in the human-computer interaction.

17 Claims, 4 Drawing Sheets

METHOD AND APPARATUS FOR OUTPUTTING INFORMATION

CROSS-REFERENCE TO RELATED APPLICATIONS

This application claims priority to Chinese Patent Application No. 201711189004.9, filed with the China National Intellectual Property Administration (CNIPA) on Nov. 16, 2017, the content of which is incorporated herein by reference in its entirety.

TECHNICAL FIELD

Embodiments of the disclosure relate to the field of computer technology, specifically to the field of Internet technology, and more specifically to a method and apparatus for outputting information.

BACKGROUND

With the development of computer technology, voice-based interaction has gradually become mainstream in the human-computer interaction, and has been adopted in increasingly more smart devices. In order to provide personalized services for a user demand, it usually requires the user to establish his/her own account, to facilitate establishing a user profile.

For devices with touch as the main interactive mode, the users are often the users establishing accounts, but for devices with voice interaction as the main interactive mode, the users often include not only the users establishing the accounts, e.g., at home, in a company or other places, the users may be users other than the users establishing the accounts. In this case, it is necessary to establish accounts of the users, to provide different users with customized and personalized services.

SUMMARY

Embodiments of the present disclosure present a method and apparatus for outputting information.

In a first aspect, an embodiment of the present disclosure provides a method for outputting information for a terminal device. The method includes: receiving voice information, analyzing the voice information to generate voiceprint information; matching the voiceprint information with at least one piece of pre-stored voiceprint information; outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and outputting, in response to determining the voice reply message instructing to add the new user, a voice prompt message prompting the user to bind an account.

In some embodiments, the terminal device supports logging in to at least one account, and each account of the at least one account corresponds to one piece of pre-stored voiceprint information in the at least one piece of pre-stored voiceprint information.

In some embodiments, after the outputting a voice prompt message prompting the user to bind an account, the method further includes: binding an account logged in by the user in response to detecting an account login instruction triggered by the user, and storing the voiceprint information as pre-stored voiceprint information corresponding to the account logged in by the user.

In some embodiments, after the outputting a voice prompt message prompting the user to bind an account, the method further includes: outputting, in response to detecting an account registration instruction triggered by the user, a voice prompt message for prompting the user to enter user information, and receiving the user information entered by the user; and sending an account registration request including the user information to a server to register an account, binding the registered account, and storing the voiceprint information as pre-stored voiceprint information corresponding to the registered account.

In some embodiments, the outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message includes: outputting, in response to determining the voiceprint information failing to match a piece of pre-stored voiceprint information in the at least one piece of pre-stored voiceprint information and a number of times and/or a frequency of generating the voiceprint information being greater than a preset numerical value, the voice questioning message for determining whether to add the new user, and receiving the voice reply message returned from the user based on the questioning message.

In some embodiments, the method further includes: outputting, in response to determining no pre-stored voiceprint information existing, a prompt message prompting the user to enter a voiceprint.

In some embodiments, the method further includes: determining, in response to determining pre-stored voiceprint information matching the voiceprint information existing in the at least one piece of pre-stored voiceprint information, an account corresponding to the matched pre-stored voiceprint information, using the determined account as a target account, acquiring a pre-stored user profile of a user of the target account, and outputting service information matching the pre-stored user profile.

In some embodiments, after the sending an account registration request including the user information to a server to register an account, binding the registered account, and storing the voiceprint information as pre-stored voiceprint information corresponding to the registered account, the method further includes: outputting at least one questioning message; sending the voice reply message to the server in response to receiving the voice reply message returned from the user based on the at least one questioning message, to enable the server to establish a user profile of the user based on the voice reply message; and receiving and outputting service information matching the established user profile and sent by the server.

In a second aspect, an embodiment of the disclosure provides an apparatus for outputting information for a terminal device. The apparatus includes: a first receiving unit, configured for receiving voice information, analyzing the voice information to generate voiceprint information; a matching unit, configured for matching the voiceprint information with at least one piece of pre-stored voiceprint information; a first output unit, configured for outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and a second output unit, configured for outputting, in response to determining the voice reply message instructing to add the new user, a voice prompt message prompting the user to bind an account.

In some embodiments, the terminal device supports logging in to at least one account, and each account of the at least one account corresponds to one piece of pre-stored voiceprint information in the at least one piece of pre-stored voiceprint information.

In some embodiments, the apparatus further includes: a first storage unit, configured for binding an account logged in by the user in response to detecting an account login instruction triggered by the user, and storing the voiceprint information as pre-stored voiceprint information corresponding to the account logged in by the user.

In some embodiments, the apparatus further includes: a third output unit, configured for outputting, in response to detecting an account registration instruction triggered by the user, a voice prompt message for prompting the user to enter user information and receiving the user information entered by the user; and a second storage unit, configured for sending an account registration request including the user information to a server to register an account, binding the registered account, and storing the voiceprint information as pre-stored voiceprint information corresponding to the registered account.

In some embodiments, the first output unit is further configured for: outputting, in response to determining the voiceprint information failing to match a piece of pre-stored voiceprint information in the at least one piece of pre-stored voiceprint information and a number of times and/or a frequency of generating the voiceprint information being greater than a preset numerical value, the voice questioning message for determining whether to add the new user, and receiving the voice reply message returned from the user based on the questioning message.

In some embodiments, the apparatus further includes: a fourth output unit, configured for outputting, in response to determining no pre-stored voiceprint information existing, a prompt message prompting the user to enter a voiceprint.

In some embodiments, the apparatus further includes: a fifth determining unit, configured for determining, in response to determining pre-stored voiceprint information matching the voiceprint information existing in the at least one piece of pre-stored voiceprint information, an account corresponding to the matched pre-stored voiceprint information, using the determined account as a target account, acquiring a pre-stored user profile of a user of the target account, and outputting service information matching the pre-stored user profile.

In some embodiments, the apparatus further includes: a sixth output unit, configured for outputting at least one questioning message; a sending unit, configured for sending the voice reply message to the server in response to receiving the voice reply message returned from the user based on the at least one questioning message, to enable the server to establish a user profile of the user based on the voice reply message; and a second receiving unit, configured for receiving and outputting service information matching the established user profile and sent by the server.

In a third aspect, an embodiment of the present disclosure provides a terminal device, including: one or more processors; and a memory for storing one or more programs, wherein the one or more programs enable, when executed by the one or more processors, the one or more processors to implement the method according to any one embodiment of the method for outputting information.

In a fourth aspect, an embodiment of the disclosure provides a computer readable storage medium storing a computer program therein, wherein the program implements, when executed by a processor, the method according to any one embodiment of the method for outputting information.

The method and apparatus for outputting information provided by the embodiments of the present disclosure, by analyzing the received voice information to obtain voiceprint information, then matching the voiceprint information with at least one piece of pre-stored voiceprint information, outputting a voice questioning message for determining whether to add a new user if the match fails, and receiving a voice reply message returned from a user based on the questioning message, and finally outputting a voice prompt message prompting the user to bind an account in response to determining that the voice reply message instructs to add the new user, thereby may realize binding an account through voiceprint recognition in a public terminal device, and improving the flexibility in human-computer interaction.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
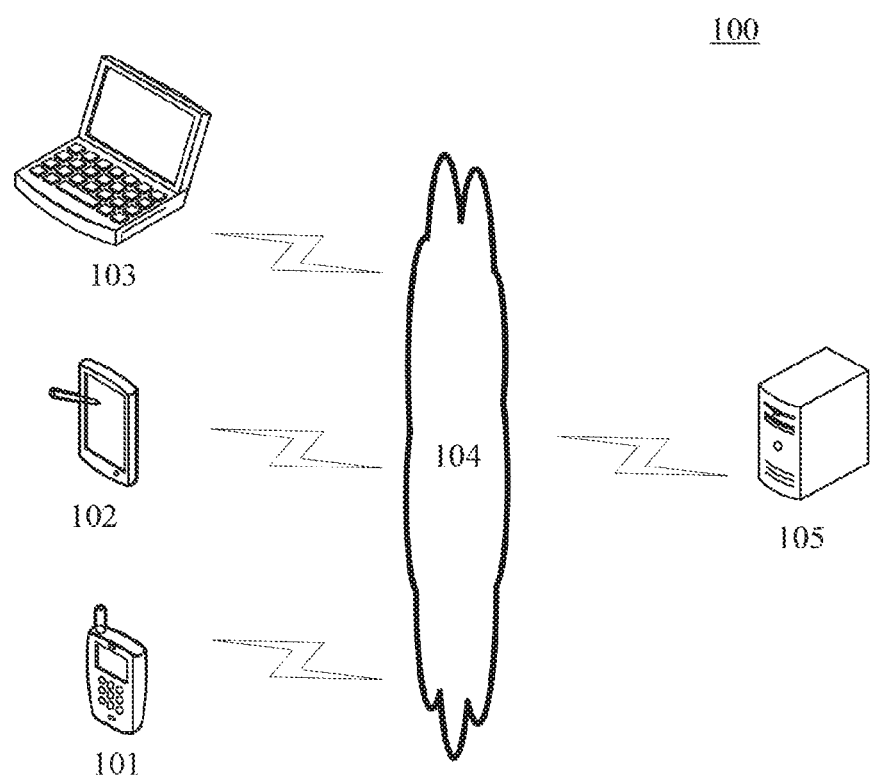
FIG. 1 is an architecture of a system in which some embodiments of the present disclosure may be applied.

FIG. 1 shows an architecture of a system 100 in which a method or an apparatus for outputting information according to some embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as voice interactive applications, voice text conversation applications, web browser application, shopping applications, search applications, instant messaging tools, mailbox clients, and social platform software may be installed on the terminal devices 101, 102 and 103, where the voice text conversation application may provide various service information such as food recommendations, movie recommendations, daily reminders, and private subscriptions.

The terminal devices 101, 102 and 103 may be various electronic devices having display screens and supporting web browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server provides support for the voice interactive applications on the terminal devices 101, 102 and 103. The backend server may store and manage massive voiceprint information of the users, and may also receive accounts registration or login request sent from the terminal devices 101, 102 and 103, and return corresponding service information to the terminal devices.

It should be noted that the method for outputting information according to the embodiments of the present disclosure is generally executed by the terminal devices 101, 102 and 103. Accordingly, an information outputting apparatus is generally installed on the terminal devices 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
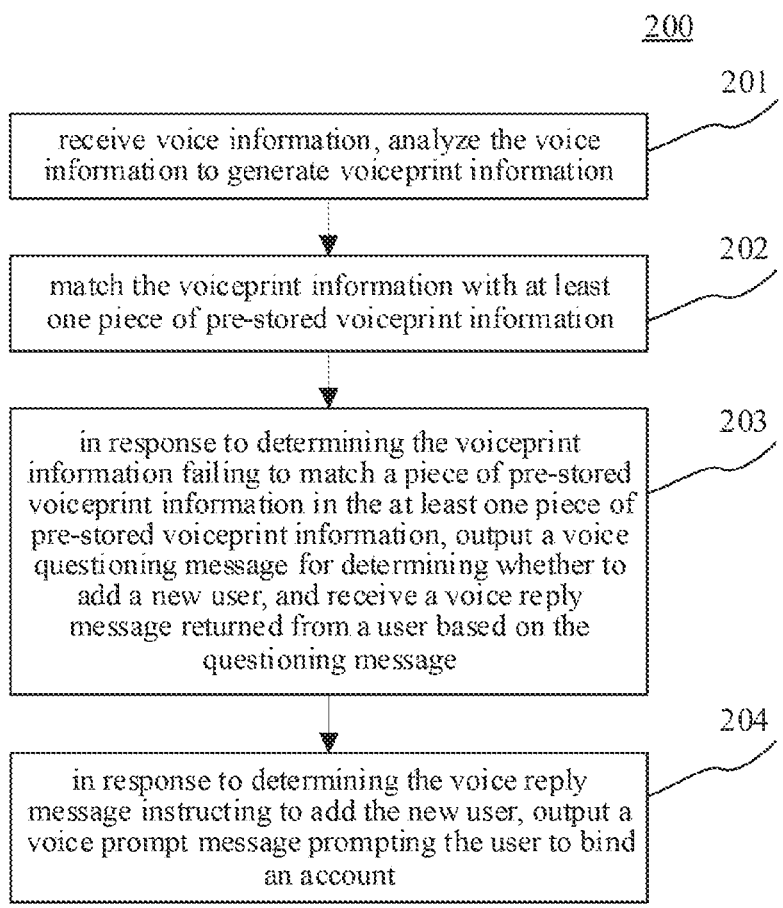
FIG. 2 is a flow chary of a method for outputting information according to an embodiment of the present disclosure.

Further referring to FIG. 2, which shows a flow 200 of a method for outputting information for a terminal device according to an embodiment of the present disclosure. The method for outputting information includes:

step 201: receiving voice information, analyzing the voice information to generate voiceprint information.

In the present embodiment, an electronic device (e.g., the terminal devices 101, 102 and 103 shown in FIG. 1) in which the method for outputting information runs may receive the voice information entered by a user, analyze the received voice information to generate the voiceprint information. The voiceprint information may be various kinds of information characterizing voiceprint characteristics (for example, may be expressed as a vector or a matrix). The voiceprint characteristics may be a variety of basic elements associated with a voiceprint (e.g., a frequency value of a resonant peak or a sound intensity). Here, the electronic device may analyze the voice information using a variety of voiceprint recognition technologies to generate the voiceprint information. As an example, the electronic device may extract the voiceprint characteristics using an existing model (e.g., an implicit Markov model or a neural network) that may be used for voiceprint recognition to generate the voiceprint information. It should be noted that the method for generating voiceprint information is prior technique currently widely researched and applied, and is not repeated any more here.

step 202: matching the voiceprint information with at least one piece of pre-stored voiceprint information.

In the present embodiment, the electronic device may match the voiceprint information with at least one piece of pre-stored voiceprint information. As an example, the electronic device may calculate a similarity between the voiceprint information and pieces of pre-stored voiceprint information in the at least one piece of pre-stored voiceprint information, and may determine that, if the similarity between the voiceprint information and a piece of pre-stored voiceprint information is greater than a preset similarity threshold, the voiceprint information matches the piece of pre-stored voiceprint information.

In some optional implementations of the present embodiment, the at least one piece of pre-stored voiceprint information may be stored in the electronic device locally. In this case, the electronic device may directly retrieve the pre-stored voiceprint information locally for matching.

In some optional implementations of the present embodiment, the at least one piece of pre-stored voiceprint information may be stored in the server (e.g., the server 105 shown in FIG. 1). The electronic device may send the voiceprint information to the server, and receive the voiceprint information matching result from the server.

step 203: in response to determining the voiceprint information failing to match a piece of pre-stored voiceprint information in the at least one piece of pre-stored voiceprint information, outputting a voice questioning message for determining whether to add a new user, and receiving a voice reply message returned from a user based on the questioning message.

In the present embodiment, in response to determining the voiceprint information failing to match a piece of pre-stored voiceprint information in the at least one piece of pre-stored voiceprint information, the electronic device may output a voice questioning message for determining whether to add a new user, and receive a voice reply message returned from a user based on the questioning message.

step 204: in response to determining that the voice reply message instructs to add the new user, outputting a voice prompt message prompting the user to bind an account.

In the present embodiment, the electronic device may analyze the voice reply message of the user using a variety of voice recognition techniques (for example, an existing implicit Markov model or artificial neural network that may achieve a voice recognition function) to determine the reply content of the user. Then a voice prompt message prompting the user to bind an account is outputted, in response to determining that the voice reply message instructs to add the new user.

The method provided by the embodiments of the present disclosure, through analyzing the received voice information to obtain voiceprint information, then matching the voiceprint information with at least one piece of pre-stored voiceprint information, outputting a voice questioning message for determining whether to add a new user if the match fails, and receiving a voice reply message returned from a user based on the questioning message, and finally outputting a voice prompt message prompting the user to bind an account in response to determining that the voice reply message instructs to add the new user, thereby may realize binding an account through voiceprint recognition in a public terminal device, and improving the flexibility in the human-computer interaction.

Figure 3:
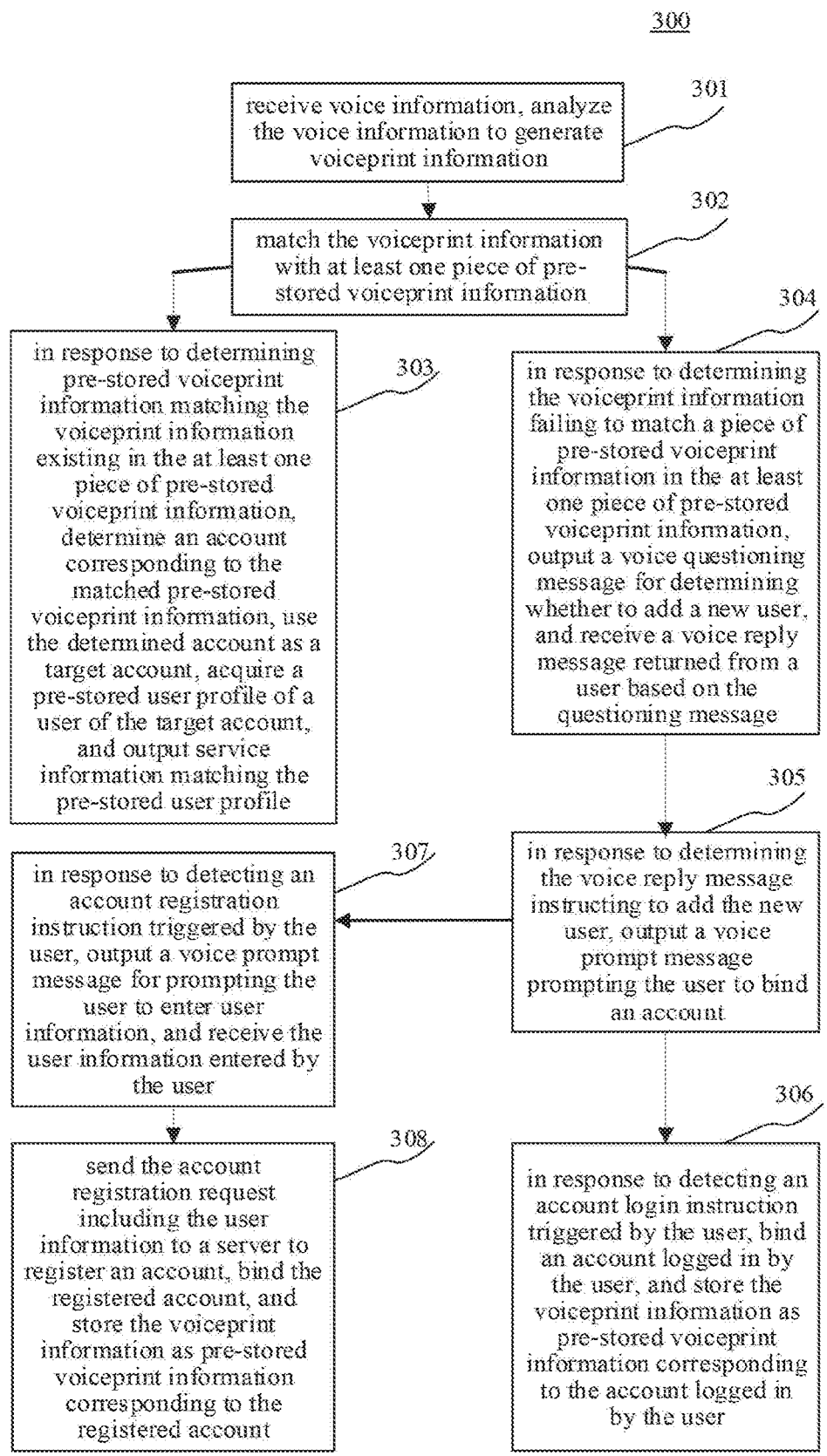
FIG. 3 is a flow chart of a method for outputting information according to another embodiment of the present disclosure.

Further referring to FIG. 3, which shows a flow 300 of a method for outputting information according to another embodiment. The flow 300 of the method for outputting information includes:

step 301: receiving voice information, analyzing the voice information to generate voiceprint information.

In the present embodiment, an electronic device (e.g., the terminal devices 101, 102 and 103 shown in FIG. 1) in which the method for outputting information runs may receive the voice information entered by a user, analyze the received voice information to generate voiceprint information.

step 302: matching the voiceprint information with at least one piece of pre-stored voiceprint information.

In the present embodiment, the electronic device may match the voiceprint information with at least one piece of pre-stored voiceprint information. As an example, the electronic device may calculate a similarity between the voiceprint information and pieces of pre-stored voiceprint information of the at least one piece of pre-stored voiceprint information, and may determine, if the similarity between the voiceprint information and a piece of pre-stored voiceprint information is greater than a preset similarity threshold, the voiceprint information matching the piece of pre-stored voiceprint information.

In the present embodiment, the electronic device may output a prompt message prompting the user to enter a voiceprint, in response to determining that no pre-stored voiceprint information exists. Here, the electronic device may output the prompt message by voice or character.

In practice, the electronic device may support logging in to at least one account simultaneously, and each account of the at least one account corresponds to one piece of pre-stored voiceprint information of the at least one piece of pre-stored voiceprint information, i.e., there is one-to-one correspondence between the at least one account and the at least one piece of pre-stored voiceprint information. It should be noted that each account may correspond to one user.

step 303: determining, in response to determining that the pre-stored voiceprint information matching the voiceprint information exists in the at least one piece of pre-stored voiceprint information, an account corresponding to the matched pre-stored voiceprint information, using the determined account as a target account, acquiring a pre-stored user profile of a user of the target account, and outputting service information matching the pre-stored user profile.

In the present embodiment, in response to determining that the pre-stored voiceprint information matching the voiceprint information exists in the at least one piece of pre-stored voiceprint information, the electronic device may determine an account corresponding to the matched pre-stored voiceprint information, use the determined account as a target account, acquire a pre-stored user profile of a user of the target account, and output service information matching the pre-stored user profile. It should be noted that the user profile and the service information may be stored in the server. The user may send a request to the server to acquire the user profile and the service information matching the user profile. It should be noted that the user profile may be a tag characterizing a user attribute. The user attribute may be various kinds of information associated with the user, such as age, occupation, residence, and gender. The service information may be different types of information configured for different tags (for example, the service information for female may be cosmetics information, merchandise discount information or the like; the service information for young people may be food recommendation information, movie recommendation information or the like).

step 304: in response to determining that the voiceprint information fails to match a piece of pre-stored voiceprint information in the at least one piece of pre-stored voiceprint information, outputting a voice questioning message for determining whether to add a new user, and receiving a voice reply message returned from a user based on the questioning message.

In the present embodiment, the electronic device may output a voice questioning message for determining whether to add a new user, in response to determining that the voiceprint information fails to match a piece of pre-stored voiceprint information in the at least one piece of pre-stored voiceprint information, and receive a voice reply message returned from a user based on the questioning message.

In some optional implementations of the present embodiment, the electronic device may output the voice questioning message for determining whether to add the new user, and receive the voice reply message returned from the user based on the questioning message, in response to determining that the voiceprint information fails to match a piece of pre-stored voiceprint information in the at least one piece of pre-stored voiceprint information and a number of times and/or a frequency of generating the voiceprint information is greater than a preset numerical value.

step 305: in response to determining that the voice reply message instructs to add the new user, outputting a voice prompt message prompting the user to bind an account.

In the present embodiment, the electronic device may output a voice prompt message prompting the user to bind an account, in response to determining that the voice reply message instructs to add the new user.

step 306: binding an account logged in by the user in response to detecting an account login instruction triggered by the user, and storing the voiceprint information as the pre-stored voiceprint information corresponding to the account logged in by the user.

In the present embodiment, the electronic device may bind an account logged in by the user in response to detecting an account login instruction triggered by the user, and store the voiceprint information as pre-stored voiceprint information corresponding to the account logged in by the user. In practice, the user may trigger an account login instruction in various ways. As an example, the user may trigger an account login instruction by touching a button on the terminal device, or by voice (e.g., saying "logging in my account").

It should be noted that after storing the voiceprint information as pre-stored voiceprint information corresponding to the account logged in by the user, the electronic device may further acquire a pre-stored user profile of the user and service information corresponding to the pre-stored user profile from the server, and output the service information.

step 307: in response to detecting an account registration instruction triggered by the user, outputting a voice prompt message for prompting the user to enter user information, and receiving the user information entered by the user.

In the present embodiment, the electronic device may output a voice prompt message for prompting the user to enter user information, in response to detecting an account registration instruction triggered by the user, and receive the user information entered by the user. In practice, the user may trigger an account registration instruction in various ways. As an example, the user may trigger an account registration instruction by touching a button on the terminal device, or by voice (e.g., saying "registering my account").

It should be noted that, the user may enter the user information through character input or voice input.

step 308: sending an account registration request including the user information to a server to register an account, binding the registered account, and storing the voiceprint information as the pre-stored voiceprint information corresponding to the registered account.

In the present embodiment, after receiving the user information, the electronic device may send an account registration request including the user information to a server to register an account, then the electronic device may bind the registered account, and store the voiceprint information as the pre-stored voiceprint information corresponding to the registered account.

In the present embodiment, after storing the voiceprint information as the pre-stored voiceprint information corresponding to the registered account, the electronic device may further execute following: firstly outputting at least one questioning message (e.g., questioning the user's age, occupation or the like); then sending the voice reply message to the server in response to receiving the voice reply message returned from the user based on the at least one questioning message, to enable the server to establish a user profile of the user based on the voice reply message; and finally receiving and outputting service information matching the established user profile and sent by the server.

As can be seen from FIG. 3, compared with the embodiment corresponding to FIG. 2, the flow 300 of the method for outputting information in the embodiment highlights the steps of human-computer interaction, generating a user profile and pushing service information in the process of user login or registering an account. Therefore, the solution described in the present embodiment can not only improve the flexibility in the human-computer interaction, but also provide customized and personalized services for different users of a given terminal device, and has realized outputting service-specific information.

Figure 4:
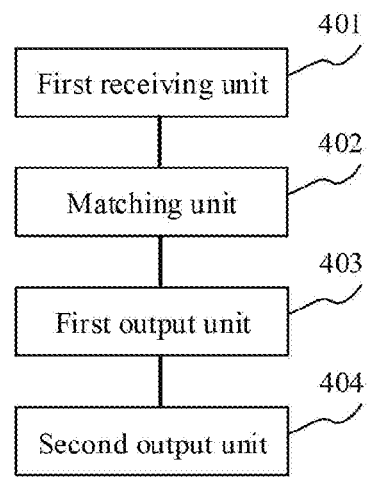
FIG. 4 is a structural schematic diagram of an apparatus for outputting information according to an embodiment of the present disclosure.

Further referring to FIG. 4. As an implementation of the method shown in the above figures, the disclosure provides an embodiment of an apparatus for outputting information. The embodiment of the apparatus corresponds to the embodiment of the method shown in FIG. 2. The apparatus may be specifically applied to a variety of electronic devices.

As shown in FIG. 4, an apparatus 400 for outputting information according to the present embodiment includes: a first receiving unit 401, configured for receiving voice information, analyzing the voice information to generate voiceprint information; a matching unit 402, configured for matching the voiceprint information with at least one piece of pre-stored voiceprint information; a first output unit 403, configured for outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and a second output unit 404, configured for outputting, in response to determining the voice reply message instructing to add the new user, a voice prompt message prompting the user to bind an account.

In the present embodiment, the first receiving unit 401 may receive the voice information entered by a user, analyze the received voice information to generate voiceprint information.

In the present embodiment, the matching unit 402 may match the voiceprint information with at least one piece of pre-stored voiceprint information. As an example, the matching unit 402 may calculate a similarity between the voiceprint information and pieces of pre-stored voiceprint information of the at least one piece of pre-stored voiceprint information, and may determine that, if the similarity between the voiceprint information and a piece of pre-stored voiceprint information is greater than a preset similarity threshold, the voiceprint information matches the pre-stored voiceprint information.

In the present embodiment, in response to determining that the voiceprint information fails to match a piece of pre-stored voiceprint information in the at least one piece of pre-stored voiceprint information, the first outputting unit 403 may output a voice questioning message for determining whether to add a new user, and receive a voice reply message returned from a user based on the questioning message.

In the present embodiment, the second output unit 404 may analyze the voice reply message of the user using a variety of voice recognition techniques (for example, an existing implicit Markov model or artificial neural network that may achieve a voice recognition function) to determine the reply content of the user. Then a voice prompt message prompting the user to bind an account is outputted, in response to determining that the voice reply message instructs to add the new user.

In some optional implementations of the present embodiment, the terminal device supports logging in to at least one account, and each account of the at least one account corresponds to one piece of pre-stored voiceprint information of the at least one piece of pre-stored voiceprint information.

In some optional implementations of the present embodiment, the apparatus may further include a first storage unit (not shown in the figure). The first storage unit may be configured for binding, in response to detecting an account login instruction triggered by the user, an account logged in by the user, and storing the voiceprint information as pre-stored voiceprint information corresponding to the account logged in by the user.

In some optional implementations of the present embodiment, the apparatus may further include a third output unit and a second storage unit (not shown in the figure). The third output unit may be configured for outputting, in response to detecting an account registration instruction triggered by the user, a voice prompt message for prompting the user to enter user information, and receiving the user information entered by the user. The second storage unit may be configured for sending an account registration request including the user information to a server to register an account, binding the registered account, and storing the voiceprint information as pre-stored voiceprint information corresponding to the registered account.

In some optional implementations of the present embodiment, the first output unit 403 may be further configured for outputting, in response to determining that the voiceprint information fails to match a piece of pre-stored voiceprint information in the at least one piece of pre-stored voiceprint information and a number of times and/or a frequency of generating the voiceprint information is greater than a preset numerical value, the voice questioning message for determining whether to add the new user, and receiving the voice reply message returned from the user based on the questioning message.

In some optional implementations of the present embodiment, the apparatus may further include a fourth output unit (not shown in the figure). The fourth output unit may be configured for outputting a prompt message prompting the user to enter a voiceprint, in response to determining that no pre-stored voiceprint information exists.

In some optional implementations of the present embodiment, the apparatus may further include a fifth output unit (not shown in the figure). The fifth output unit may be configured for determining, in response to determining that pre-stored voiceprint information matching the voiceprint information exists in the at least one piece of pre-stored voiceprint information, an account corresponding to the matched pre-stored voiceprint information, using the determined account as a target account, acquiring a pre-stored user profile of a user of the target account, and outputting service information matching the pre-stored user profile.

In some optional implementations of the present embodiment, the apparatus may further include a sixth output unit, a sending unit and a second receiving unit (not shown in the figure). The sixth output unit may be configured for outputting at least one questioning message. The sending unit may be configured for sending the voice reply message to the server in response to receiving the voice reply message returned from the user based on the at least one questioning message, to enable the server to establish a user profile of the user based on the voice reply message. The second receiving unit may be configured for receiving and outputting service information matching the established user profile and sent by the server.

The apparatus provided by the embodiments of the present disclosure, through analyzing the received voice information to obtain voiceprint information by the first receiving unit 401, then matching the voiceprint information with at least one piece of pre-stored voiceprint information by the matching unit 402, if the match fails, outputting a voice questioning message for determining whether to add a new user, and receiving a voice reply message returned from a user based on the questioning message by the first output unit 403, and finally outputting, in response to determining that the voice reply message instructs to add the new user, a voice prompt message prompting the user to bind an account by the second output unit 404, thereby realizes binding an account through voiceprint recognition in a public terminal device, and improving the flexibility in the human-computer interaction.

Figure 5:
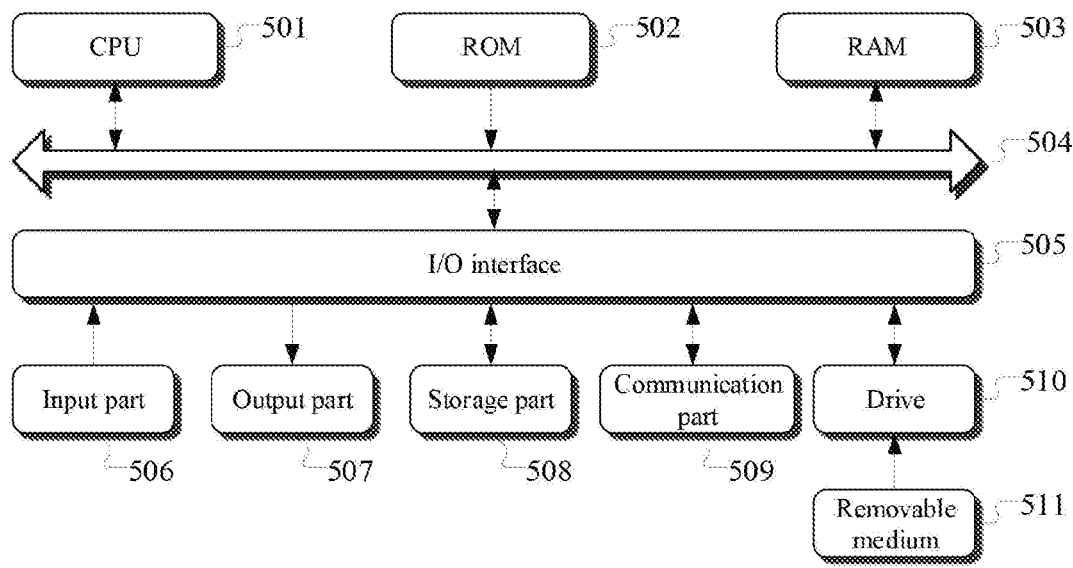
FIG. 5 is a structural schematic diagram of a computer system suitable for implementing a terminal device according to an embodiment of the present disclosure.

Referring to FIG. 5, a schematic structural diagram of a computer system 500 adapted to implement a terminal device of the embodiments of the present disclosure is shown. The terminal device shown in FIG. 5 is merely an example and should bring no limitation on the function and usage range of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a touch screen, a touchpad etc.; an output portion 507 including a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions. The units or modules involved in the embodiments of the present disclosure may be implemented by means of software or hardware. The described units or modules may also be provided in a processor, for example, described as: a processor, comprising a first receiving unit, a matching unit, a first outputting unit and a second outputting unit, where the names of these units or modules do not in some cases constitute a limitation to such units or modules themselves. For example, the first receiving unit may also be described as "a unit for receiving voice information."

In another aspect, some embodiments of the present disclosure further provide a computer-readable medium. The computer-readable medium may be the computer medium included in the apparatus in the above described embodiments, or a stand-alone computer-readable medium not assembled into the apparatus. The computer-readable medium stores one or more programs. The one or more programs, when executed by a device, cause the device to: receive voice information, analyzing the voice information to generate voiceprint information; match the voiceprint information with at least one piece of pre-stored voiceprint information; output a voice questioning message for determining whether to add a new user, in response to determining the voiceprint information failing to match a piece of pre-stored voiceprint information in the at least one piece of pre-stored voiceprint information, and receiving a voice reply message returned from a user based on the questioning message; and output a voice prompt message prompting the user to bind an account, in response to determining the voice reply message instructing to add the new user.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information for a terminal device, comprising:
   receiving voice information, analyzing the voice information to generate voiceprint information;
   matching the voiceprint information with at least one piece of pre-stored voiceprint information;
   outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and
   outputting, in response to determining the voice reply message instructing to add the new user, a voice prompt message prompting the user to bind an account,
   wherein the method is performed by at least one processor.

2. The method for outputting information according to claim 1, wherein the terminal device supports logging in to at least one account, and each account of the at least one account corresponds to one piece of pre-stored voiceprint information in the at least one piece of pre-stored voiceprint information.

3. The method for outputting information according to claim 1, wherein after the outputting a voice prompt message prompting the user to bind an account, the method further comprises:
   binding an account logged in by the user in response to detecting an account login instruction triggered by the user, and storing the voiceprint information as pre-stored voiceprint information corresponding to the account logged in by the user.

4. The method for outputting information according to claim 1, wherein after the outputting a voice prompt message prompting the user to bind an account, the method further comprises:
   outputting, in response to detecting an account registration instruction triggered by the user, a voice prompt message for prompting the user to enter user information, and receiving the user information entered by the user; and
   sending an account registration request including the user information to a server to register an account, binding the registered account, and storing the voiceprint information as pre-stored voiceprint information corresponding to the registered account.

5. The method for outputting information according to claim 1, wherein the outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message comprises:
   outputting, in response to determining the voiceprint information failing to match a piece of pre-stored voiceprint information in the at least one piece of pre-stored voiceprint information and a number of times and/or a frequency of generating the voiceprint information being greater than a preset numerical value, the voice questioning message for determining whether to add the new user, and receiving the voice reply message returned from the user based on the questioning message.

6. The method for outputting information according to claim 1, further comprising:
   outputting, in response to determining no pre-stored voiceprint information existing, a prompt message prompting the user to enter a voiceprint.

7. The method for outputting information according to claim 2, further comprising:
   determining, in response to determining pre-stored voiceprint information matching the voiceprint information existing in the at least one piece of pre-stored voiceprint information, an account corresponding to the matched pre-stored voiceprint information, using the determined account as a target account, acquiring a pre-stored user profile of a user of the target account, and outputting service information matching the pre-stored user profile.

8. The method for outputting information according to claim 4, wherein after the sending an account registration request including the user information to a server to register an account, binding the registered account, and storing the voiceprint information as pre-stored voiceprint information corresponding to the registered account, the method further comprises:
outputting at least one questioning message;
sending the voice reply message to the server in response to receiving the voice reply message returned from the user based on the at least one questioning message, to enable the server to establish a user profile of the user based on the voice reply message; and
receiving and outputting service information matching the established user profile and sent by the server.

9. An apparatus for outputting information for a terminal device, comprising:
at least one processor; and
a memory storing instructions, the instructions when executed by the at least one processor, cause the at least one processor to perform operations, the operations comprising:
receiving voice information, analyzing the voice information to generate voiceprint information;
matching the voiceprint information with at least one piece of pre-stored voiceprint information;
outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and
outputting, in response to determining the voice reply message instructing to add the new user, a voice prompt message prompting the user to bind an account.

10. The apparatus for outputting information according to claim 9, wherein the terminal device supports logging in to at least one account, and each account of the at least one account corresponds to one piece of pre-stored voiceprint information in the at least one piece of pre-stored voiceprint information.

11. The apparatus for outputting information according to claim 9, further configured for:
binding an account logged in by the user in response to detecting an account login instruction triggered by the user, and storing the voiceprint information as pre-stored voiceprint information corresponding to the account logged in by the user.

12. The apparatus for outputting information according to claim 9, further configured for:
outputting, in response to detecting an account registration instruction triggered by the user, a voice prompt message for prompting the user to enter user information, and receiving the user information entered by the user; and
sending an account registration request including the user information to a server to register an account, binding the registered account, and storing the voiceprint information as pre-stored voiceprint information corresponding to the registered account.

13. The apparatus for outputting information according to claim 9, wherein the outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message comprises:
outputting, in response to determining the voiceprint information failing to match a piece of pre-stored voiceprint information in the at least one piece of pre-stored voiceprint information and a number of times and/or a frequency of generating the voiceprint information being greater than a preset numerical value, the voice questioning message for determining whether to add the new user, and receiving the voice reply message returned from the user based on the questioning message.

14. The apparatus for outputting information according to claim 9, further configured for:
outputting, in response to determining no pre-stored voiceprint information existing, a prompt message prompting the user to enter a voiceprint.

15. The apparatus for outputting information according to claim 10, further configured for:
determining, in response to determining pre-stored voiceprint information matching the voiceprint information existing in the at least one piece of pre-stored voiceprint information, an account corresponding to the matched pre-stored voiceprint information, using the determined account as a target account, acquiring a pre-stored user profile of a user of the target account, and outputting service information matching the pre-stored user profile.

16. The apparatus for outputting information according to claim 12, further configured for:
outputting at least one questioning message;
sending the voice reply message to the server in response to receiving the voice reply message returned from the user based on the at least one questioning message, to enable the server to establish a user profile of the user based on the voice reply message; and
receiving and outputting service information matching the established user profile and sent by the server.

17. A non-transitory computer readable storage medium storing a computer program, wherein the computer program, when executed by a processor, cause the processor to perform operations, the operation comprising:
receiving voice information, analyzing the voice information to generate voiceprint information;
matching the voiceprint information with at least one piece of pre-stored voiceprint information;
outputting, in response to determining the voiceprint information failing to match a piece of pre-stored voiceprint information in the at least one piece of pre-stored voiceprint information, a voice questioning message for determining whether to add a new user, and receiving a voice reply message returned from a user based on the questioning message; and
outputting, in response to determining the voice reply message instructing to add the new user, a voice prompt message prompting the user to bind an account.

* * * * *